US011933479B1

(12) United States Patent
Patterson et al.

(10) Patent No.: US 11,933,479 B1

(45) Date of Patent: Mar. 19, 2024

(54) ARRANGING LED CLUSTERS IN A LUMINAIRE LIGHT FIXTURE

(71) Applicant: Insight Lighting, Inc., Rio Rancho, NM (US)

(72) Inventors: Geoffry Patterson, Rio Rancho, NM (US); Jaxon Patterson, Rio Rancho, NM (US)

(73) Assignee: INSIGHT LIGHTING, INC., Rio Rancho, NM (US)

( * ) Notice: Subject to any disclaimer, the term of this patent is extended or adjusted under 35 U.S.C. 154(b) by 0 days.

(21) Appl. No.: 18/204,283

(22) Filed: May 31, 2023

(51) Int. Cl.

| | |
|---|---|
| ***F21V 19/00*** | (2006.01) |
| *F21Y 113/10* | (2016.01) |
| *F21Y 115/10* | (2016.01) |

(52) U.S. Cl.
CPC ......... *F21V 19/001* (2013.01); *F21Y 2113/10* (2016.08); *F21Y 2115/10* (2016.08)

(58) Field of Classification Search
CPC ..................................................... F21V 19/001
See application file for complete search history.

(56) References Cited

U.S. PATENT DOCUMENTS

| | | | | |
|---|---|---|---|---|
| 9,736,895 | B1 * | 8/2017 | Dong | F21V 5/004 |
| 2004/0218387 | A1 * | 11/2004 | Gerlach | F21K 9/00 362/240 |
| 2006/0226336 | A1 * | 10/2006 | York | G02B 6/4298 250/206 |
| 2007/0200121 | A1 * | 8/2007 | Lankhorst | G02F 1/133603 257/79 |
| 2017/0023219 | A1 * | 1/2017 | Grunzweig | F21V 23/002 |
| 2021/0098433 | A1 * | 4/2021 | Alfier | H01L 25/0753 |

OTHER PUBLICATIONS

Patterson, G. et al.; FIG. 4 from the instant U.S. Appl. No. 18/204,283; the embodiment of FIG. 4 was on sale prior to May 31, 2022.

* cited by examiner

*Primary Examiner* — Christopher E Dunay
(74) *Attorney, Agent, or Firm* — Rod D. Baker

(57) ABSTRACT

A light fixture apparatus with at least one multi-color light emitting diode (LED) cluster. Each LED cluster preferably includes four differently colored LEDs, or four different color-correlated temperature LEDs, in a single optic defining a foursquare array. A cluster thus arranged thereby promotes thorough mixing of the differing wavelengths of light emitted by the cluster. Further, a plurality of such clusters may be arranged so to enhance or optimize color mixing amongst the plurality of clusters. A series of LED clusters may be situated linearly along a suitable substrate in a luminaire for emitting visible light.

5 Claims, 4 Drawing Sheets

ARRANGING LED CLUSTERS IN A LUMINAIRE LIGHT FIXTURE

BACKGROUND OF THE INVENTION

Field of the Invention

This invention relates to light fixtures, particularly to a light fixture including a light emitting diode (LED) cluster, and such clusters linearly arranged in a luminaire fixture, and specifically to a manner of arranging LED clusters along an LED strip in a luminaire.

Background of the Invention

Light emitting diodes, usually referred to simply as LEDs, are among the most widely used among all the extensive variety of semiconductor diodes widely available today. Light emitting diodes are made from a thin layer of fairly heavily doped semiconductor material and, depending on the semiconductor material used and the amount of doping, when forward-biased an LED will emit light at a particular spectral wavelength. An LED emits a narrow bandwidth of either visible light (different LEDs can emit different colored wavelengths), invisible infra-red light (e.g., for remote controls), or coherent laser light, when a forward current is passed through it. When a diode is powered forward biased, electrons from the semiconductor's conduction band recombine with holes from the valence band to release enough energy to generate photons, resulting in the emission of a light. Because of the thinness of the doped semiconductor, a reasonable number of photons leave the junction and radiate away and output light. In sum, when operated in a forward biased direction, LEDs are semiconductor devices that convert electrical energy into light energy.

"Color" LEDs are commonly included in various kinds of electrical light sources. Light emitting diodes are fabricated from semiconductor compounds such as gallium arsenide (GaAs), gallium arsenide phosphide (GaAsP), silicon carbide (SiC), gallium phosphide (GaP), or gallium indium nitride (GaInN), often all mixed together at different ratios to produce a distinct wavelength of color. Different LED compounds emit light in specific regions of the visible light spectrum and therefore produce different intensity levels. For instance, at 20 milliamperes (mA), a typical gallium arsenide LED commonly emits an infrared light at a wavelength of around 850-940 nanometers (nm) when driven at a forward voltage ($V_F$) of about 1.2 volts; a GaAsP LED emits a visible red light at a wavelength of about 630-660 nm ($V_F \approx 1.8$ v); the GaAsP LED may emit an amber-colored light in a wavelength range of 605-620 nm when driven at $V_F \approx 2.0$ v; a GaAsP:N diode emits yellow light in a range of around 585-595 nm at $V_F \approx 2.2$ v; an AlGaP LED typically emits a visible green light in the wavelength range of about 550-570 nm at $V_F \approx 3.5$ v; an SiC LED emits a visible blue light in a wavelength range of around 430-505 nm at $V_F \approx 3.6$ v; and a GaInN LED emits a while light at around 450 nm wavelength at $V_F \approx 4.0$ v.

The selection of the semiconductor material(s) employed in forming the diode PN junction therefore determines the overall wavelength of the photon light emissions, and thus the resulting color, of the light emitted from a particular LED. Light emitting diodes are available commercially in a wide range of colors; red, amber yellow and green are common, and thus widely used as visual indicators and as moving light displays. Blue and white colored LEDs are available, but tend to be more expensive to manufacture.

The following example listing of color LEDs can be fabricated by mixing together a variety of semiconductor, metal, and gas compounds:

Gallium Arsenide Phosphide (GaAsP): red to infra-red, orange

Aluminum Gallium Arsenide Phosphide (AlGaAsP): high-brightness red, orange-red, orange, and yellow Gallium Phosphide (GaP): red, yellow and green Aluminum Gallium Phosphide (AlGaP): green Gallium Nitride (GaN): green, emerald green Gallium Indium Nitride (GaInN): near ultraviolet, bluish-green and blue Silicon Carbide (SiC): blue (as a substrate)

Zinc Selenide (ZnSe): blue

Aluminum Gallium Nitride (AlGaN): ultraviolet

Light emitting diodes, as with all diodes, manifest a forward voltage drop $V_F$, depending on the semiconductor compound(s) and on the forward-biased LED current. Most LEDs are specified with a forward operating voltage of between approximately 1.2 volts to 3.6 volts, and a current rating of about 10 mA to about 30 mA (with 12 mA to 20 mA being the most common range). Both the forward operating voltage and forward current depend on the semiconductor material used, but the voltage at which light is generated typically is about 1.2 v for a standard red LED to about 3.6 v for a blue LED.

LEDS can be arranged and operated in linear configurations. It is known to arrange individual LEDs along an elongated base to provide "strip" light fixtures or luminaires. For 5 example, to supply a linear LED luminaire fixture a number of LEDs and resistors may be attached to a flexible circuit board that is mounted to a light fixture substrate or fixture housing. Typically, LEDs are soldered together on printed circuit boards (PCBs). After the PCBA has been completed to fabricate an LED strip, the strip is situated in the housing to provide a linear LED luminaire fixture. The fixture then can be used in any of the known manners of LED luminaire applications, e.g., direct lights, downlights, accent lights and indirect lights.

SUMMARY OF THE INVENTION

There is disclosed a light fixture devised with at least one multi-color LED cluster. Each LED cluster preferably includes four differently colored LEDs, or four different color correlated temperature LEDs, in a single optic defining a quadraplex or foursquare array. A cluster thus arranged thereby promotes thorough mixing of the differing wavelengths emitted by the cluster. Further, a plurality of such clusters may be arranged so to enhance or optimize color mixing amongst the plurality of clusters. A series of LED clusters may be situated linearly along a suitable substrate, such as a printed circuit board, to provide a strip of LED clusters. The strip can be placed in a housing to provide an LED luminaire. In such a series or strip, the array of any particular cluster is positioned differently in space in relation to the array in an adjacent cluster, which promotes the mixing of the colors of light emitted from the luminaire.

BRIEF DESCRIPTION OF THE DRAWINGS

The attached drawings, which form part of this disclosure, are as follows.

Like elements are labeled with like numerals in the several views; the drawings are not necessarily to scale, within a view or relative to each other.

DETAILED DESCRIPTION OF THE INVENTION

This invention relates to light fixtures, particularly elongated luminaires, in which light emitting diodes (LEDs) provide the emitted light. According to the invention, LEDs of different colors are arranged into one or more clusters. A plurality of LED clusters are arranged linearly along a printed circuit board (PCB), thereby constituting an LED series to provide an LED luminaire. The luminaire preferably is then disposed within a conventional housing to supply a lighting fixture. In this disclosure and in the claims, an "LED cluster" or "cluster" is an optic including four differently colored LEDs, or four different color correlated temperature (CCT) LEDs, arranged in a foursquare array. Herein, "differently colored" LEDs include LEDs of different visible wavelengths and/or different color-correlated temperature LEDs. A "foursquare" array is a quadrilateral array containing four interior quadrants. An LED is disposed in each quadrant of the array, i.e., the LEDs are arranged in a 2×2 array or pattern. Each quadrant of the cluster mounts an LED of a different color. The arrangement in a foursquare array cluster promotes the missing of the color wavelengths emitted by the cluster.

Figure 1:
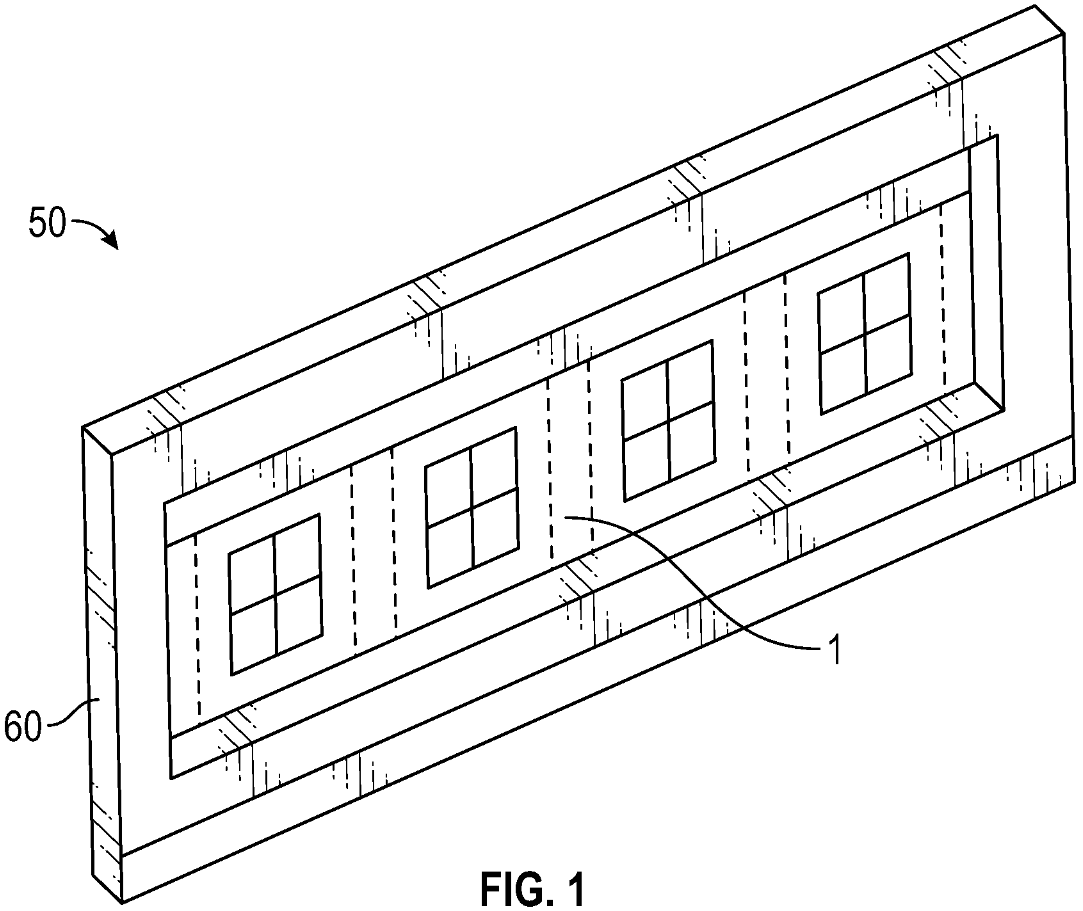
FIG. 1 is an isometric front view of a lighting fixture incorporating a luminaire according to the present invention.

FIG. 1 shows generally a lighting fixture 55 that includes a luminaire 1. The fixture 55 has a luminaire 1 contained within a primary housing 60 by which the luminaire 1 may be mounted on a suitable supporting structure (not shown). The luminaire 1 is a lighting unit featuring a plurality of light emitting diodes (LEDs) together with the parts designed to distribute the emitted light, and to position the LEDs, and to connect the LEDs to the power supply.

Figure 2:
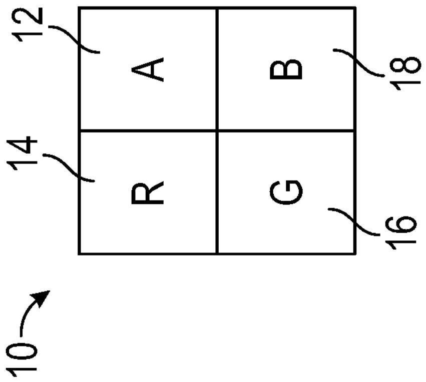
FIG. 2 is a view of an LED cluster according to the present invention, having a foursquare array of LEDs of differing colors.

The fundamental embodiment of the present invention is a foursquare array of four LEDs, as seen in FIG. 2, mounted on a suitable substrate. In such a cluster 10 there are four LEDs of different colors, for example, an amber-colored LED (A), a red LED (R), a green LED (G), and a blue LED (B). Alternatively, the cluster 10 features four different color correlated temperature (CCT) LEDs. In this disclosure, the LEDs of a cluster are referred to as having four LEDs of different colors regardless of whether single-color LEDs or CCT LEDs are utilized in a given cluster. A first cluster 10 has four LEDs 12, 14, 16, and 18.

An advantage of providing a cluster 10 incorporating LEDs of differing colors is that the resulting overall emitted color is well-mixed. By placing four static colored LEDs in a foursquare array, no single wavelength dominates the light from the cluster; the emission from each LEDs 12, 14, 16, or 18 is adjacent to its neighboring LEDs, the combined light transmission from the cluster 10 is a blend of the four wavelengths.

Figure 3:
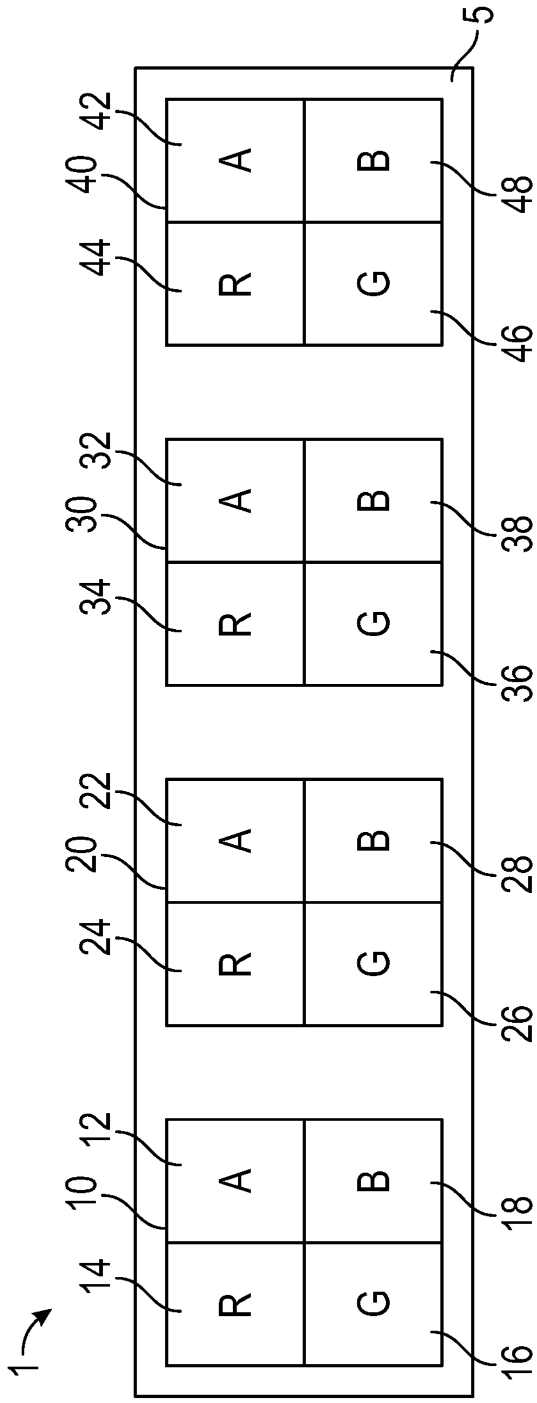
FIG. 3 is a view of a luminaire having four clusters of colored LEDs, each cluster having a foursquare array of four LEDs of differing wavelengths, the clusters all having the same orientations in a repeating pattern along the luminaire.

Reference is invited to FIG. 3, showing a luminaire having a series of LED clusters. In such an LED luminaire 1, a plurality of electrically interconnected LED clusters (four seen in FIG. 2) is disposed linearly along a suitable substrate, such as a PCB 5. There may be, for example only, four clusters 10, 20, 30, 40, although more or fewer clusters are within the scope of contemplation. Each of the clusters 10, 20, 30, 40 has four LEDs of different colors arranged in a foursquare array. One cluster 10 has four LEDs 12, 14, 16, and 18. A second cluster 20 has four LEDs 22, 24, 26, and 28. A third cluster 30 has four LEDs 32, 34, 36, and 38. A fourth cluster 40 has four LEDs 42, 44, 46, and 48. It is understood that in a preferred embodiment, the at least two LED clusters are affixed to the PCB 5; the clusters cluster 10, 20, 30, 40 ordinarily are mutually coplanar upon the PCB.

With reference still to FIG. 3, each cluster 10, 20, 30, 40 may have an LED that emits color amber (A), another LED of emitted color red (R), a third LED of emitted color green (G), and a fourth LED that emits a color blue (B). According to known fabrication techniques, the clusters 10, 20, 30, 40 are disposed along the PCB 5 with their corresponding color LEDs placed in the same position in each 2-D cartesian plane, e.g., with the amber-colored LED (A) in the first quadrant of the 2-D cartesian plane, the red-colored LED (R) in the second quadrant, the green-colored LED (G) in the third quadrant, and the blue-colored LED (B) in the fourth quadrant, as indicated in FIG. 2 and according to conventional Cartesian plane graphology and terminology. So, the arrangement of the LEDs in a cluster is the same from cluster to cluster, as one proceeds long the length of the PCB 5.

The sixteen LEDs 12-18, 22-28, 32-38, and 42-48 of a four-cluster LED strip accordingly are all positioned on the PCB 5 as seen in the example of FIG. 3. It is observed that running adjacent one side (the "top" side in FIG. 2) of the PCB 5 are only amber (A) and red (R) colored LEDs. This configuration is because the first LED 12, 22, 32, and 42 of each respective cluster 10, 20, 30, or 40 all occupy only the first quadrant of each cluster's 2-D cartesian foursquare array, while the second LEDs 14, 24, 34, and 44 of each respective cluster 10, 20, 30, or 40 all occupy only the second quadrant of each 2-D cartesian foursquare array. Likewise, running adjacent the other side (e.g., the "bottom" side in FIG. 3) of the PCB 5 are only green (G) and blue (B) colored LEDs, because the third LEDs 16, 26, 36, and 46 pertaining to each respective cluster 10, 20, 30, or 40 occupy the third quadrant of each 2-D cartesian foursquare array, while the respective fourth LEDs 18, 28, 38, and 48 occupy only the fourth quadrant of each corresponding foursquare array. (Quadrant numerations according to conventional 2-D Cartesian nomenclature.)

The afore-described positional relationships of the clusters 10, 20, 30, or 40 of the luminaire 1 of FIG. 3 result in comparatively reduced mixing of the color wavelengths emitted. In the example of FIG. 3, for instance, light emitted from the first or "top" side of the PCB 5 will be more or less dominated, or at least tinged or tinted, by reddish hues, while light emitted from the second or "bottom" side will manifest a greenish or bluish hue or tinge. The visible effect is three-dimensional in general character; that is, even light rays radiating—from all the LEDs 12-18, 22-28, 32-38 and 42-48—perpendicularly from the plane of the board 5 are not optimally mixed as one side of the luminaire has a color visibly distinct from the other side. This can cause perceptibly undesirable variations in room or surface lighting; such emission of poorly mixed colors or hues from a luminaire fixture normally is undesirable and to be avoided. Because the clusters 10, 20, 30, or 40 are attached to the board 5, this directional bias of the emitted color hue cannot be effectively addressed; one side of the luminaire 1 always emits a light hue that differs from the hue that radiates from the opposite side, regardless how the luminaire itself is oriented in three-dimensional space.

A preferred embodiment of the system and apparatus overcomes the mentioned drawback by inter-arranging the various colored LEDs in a way that the different colors are well-mixed across the entire length of the LED strip within a luminaire fixture. The array of any particular cluster (e.g., from among clusters 10, 20, 30, or 40) is positioned differently, in its two-dimensional cartesian plane, relative to the position of the array(s) of the cluster(s) adjacent to the particular given cluster, as shall be further described. Changing the relative positions of the two or more clusters, in their respective 2-D cartesian planes promotes the mixing of the colors of light emitted from all sides of the luminaire 1. In one embodiment of the invention, the arrangement of the LEDs within the foursquare array alternates between clusters, i.e., every other cluster has the same arrangement of colored LEDs. In an alternative embodiment, every fifth cluster has the same arrangement of colored LEDs.

Figure 4:
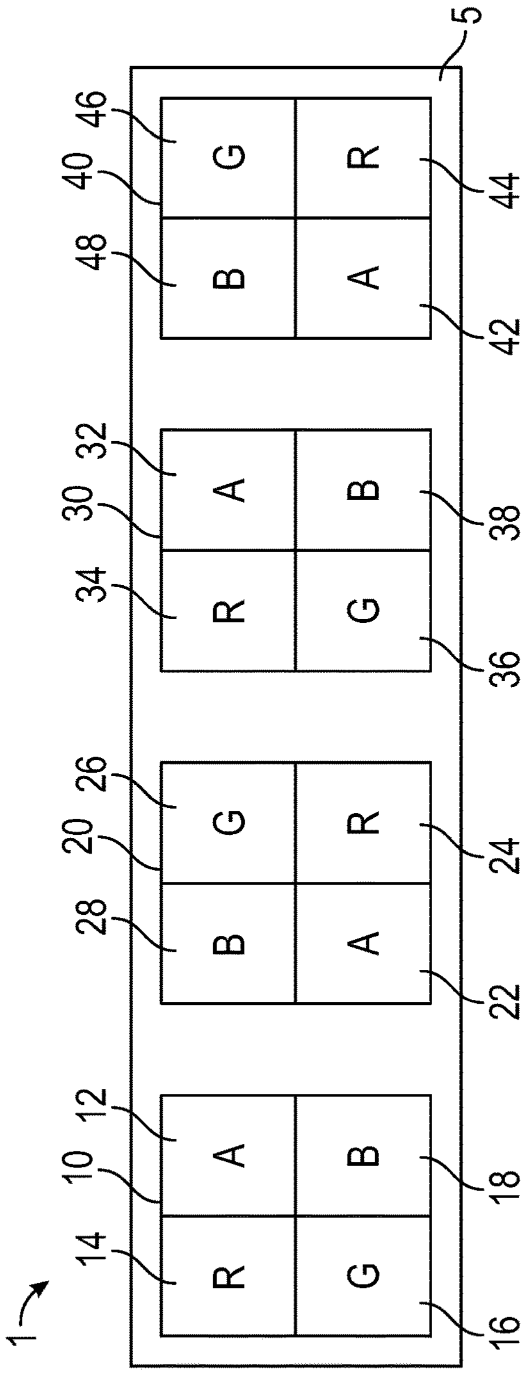
FIG. 4 is a view of a luminaire according to a preferred embodiment of the present invention, having four clusters of colored LEDs, each cluster having a foursquare array of four LEDs of differing wavelengths, but with the LEDs specially arranged and positioned.

Attention is advanced to FIG. 4, illustrating how the rotation of clusters of the luminaire 1 along the PCB 5, according to the mode of the present invention, promotes enhanced mixing of light wavelengths from the luminaire. In the exemplary embodiment of FIG. 4, alternate LED clusters are rotated angularly in the 2-D plane by 180°. The absolute positions of the first and third clusters 10, 30, in the 2-D plane, remain unchanged (relative to FIG. 3), while the second and fourth clusters 20, 40 are rotated clockwise in the 2-D plane relative to the first and third LED clusters. Thus, the first LED 22 of the second cluster 20 is situated in the third quadrant of its foursquare array, the second LED 24 of the second cluster 20 is situated in the fourth quadrant, the third LED 26 is situated in the first quadrant, and the fourth LED 28 now is located in the second quadrant. This positional configuration of the LEDs 22-28 of the second cluster 20 is duplicated for the LEDs 42-48 of the fourth cluster 40, as also seen in FIG. 4. In this disclosure, the terms "rotate" and "rotated," or "shift" and "shifted," or the like, do not refer to actual physical motion of a particular LED cluster. All the clusters are attached to a PCB 5 or other known suitable substrate, and do not actually undergo any rotary movement or shifting translation during the practice of the invention. Rather, the terms are to describe the relative position, from cluster to cluster, of the foursquare array of each cluster, there being an LED disposed in each quadrant of the array. As the position or disposition, in space, of a foursquare array in a given cluster differs from the position of the array in an adjacent cluster, the arrangement of the four colors of LEDs varies from cluster to cluster, as illustrated in the drawing figures. A basic and preferred embodiment features four individual LEDs clustered together under one optic, with the positions of alternate clusters rotated 180 degrees for superior color mixing.

It is observed therefore, that in the embodiment of FIG. 4 running adjacent one side (the "top" side in FIG. 3) of the PCB 5 are LEDs of all four colors: red (R), amber (A), blue (B) and green (G). Also, running adjacent the second side (the "bottom" side in FIG. 4) of the PCB 5 are LEDs of all four colors: green (G), blue (B), amber (A) and red (R). Such arrangement of the various LEDs in the clusters 10, 20, 30, 40 promotes a mixing of the color of the light emitted by the overall luminaire 1, as neither side of the PCB 5 is dominated by a color or only a pair of colors.

Figure 5:
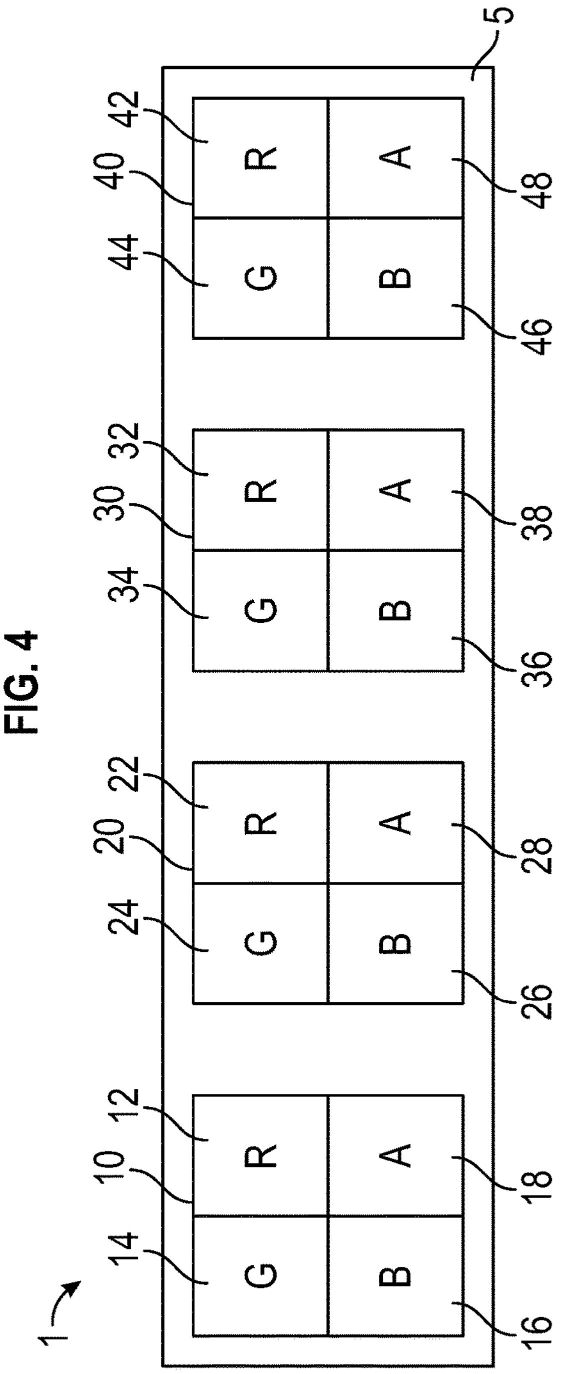
FIG. 5 is a view of another luminaire embodiment having four clusters of colored LEDs, each cluster having a foursquare array of four LEDs of differing wavelengths.

An advantage of the invention may be realized, by a reduced amount, by shifting the relative position of every other cluster by 90° rather than 180°. FIG. 5 shows another instance of how the clusters 10, 20, 30, and 40 may be arranged in a series. This version is comparable to that of FIG. 3, except that the colors of the LEDs in each cluster are designated differently from those of FIG. 3. Running along a "top" side of the PCB 5 of FIG. 5 are only green (G) and red (R) colored LEDs. The respective first (red) LED 12, 22, 32, and 42 of each associated cluster 10, 20, 30, or 40 all occupy the first quadrant of each cluster's 2-D cartesian foursquare array, while the respective second (green) LEDs 14, 24, 34, and 44 of each associated cluster 10, 20, 30, or 40 occupy only the second quadrant of each 2-D cartesian foursquare array. Disposed along the "bottom" of the PCB 5 are only blue (B) and amber (A) colored LEDs, because the respective third (blue) LEDs 16, 26, 36, and 46 pertaining to each associated cluster 10, 20, 30, or 40 occupy the third quadrant of each 2-D cartesian foursquare array, while the respective fourth (amber) LEDs 18, 28, 38, and 48 occupy only the fourth quadrant of each corresponding foursquare array.

Figure 6:
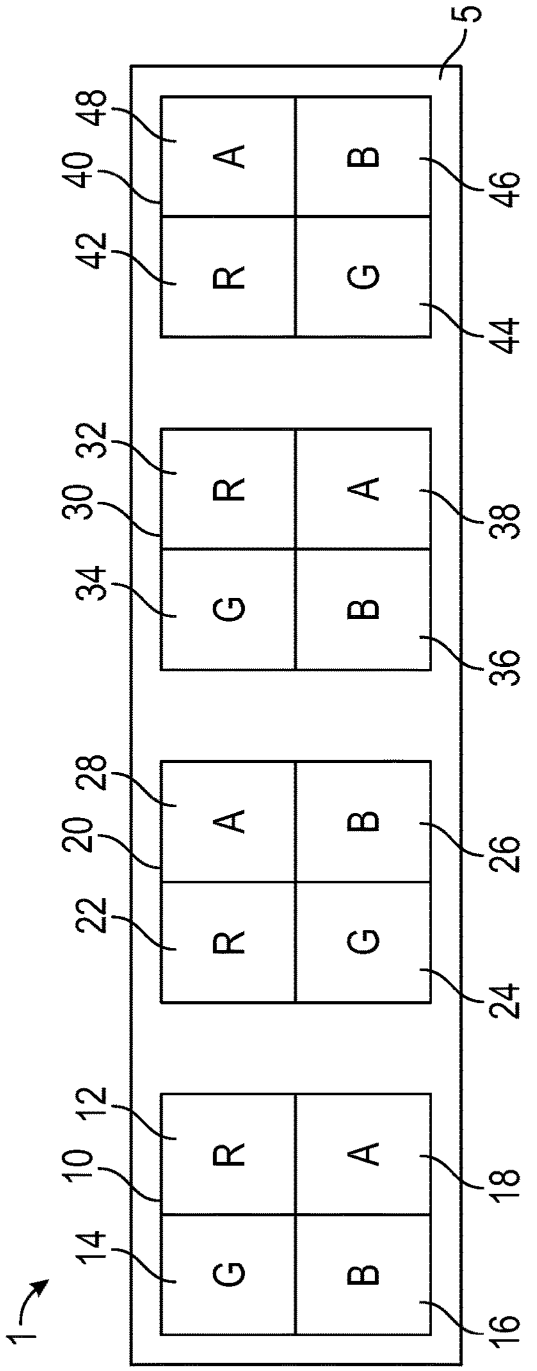
FIG. 6 is a is a view of an alternative embodiment of a luminaire according to the present invention, having four clusters of colored LEDs, each cluster having a foursquare array of four LEDs of differing wavelengths, but with the LEDs specially arranged and positioned.

Referring now to FIG. 6, alternate LED clusters have been rotated 90° in the 2-D plane. The absolute positions of the first and third clusters 10, 30, in the 2-D plane, remain unchanged (compared to FIG. 5), while the second and fourth clusters 20, 40 are rotated counterclockwise in the 2-D plane relative to the first and third LED clusters. Thus, in the embodiment of FIG. 6, the red LED 22 of the second cluster 20 is situated in the second quadrant of its foursquare array, the green LED 24 of the second cluster 20 is situated in the third quadrant, the blue LED 26 is situated in the fourth quadrant, and the amber LED 28 is located in the first quadrant. This positional configuration of the respectively colored LEDs 22-28 of the second cluster 20 is duplicated for corresponding ones of the LEDs 42-48 of the fourth cluster 40.

The alternative embodiment of FIG. 6 improves the mixing of the wavelengths of light emitted from the luminaire 1 in comparison with the alternative embodiment of FIG. 5. It is observed in the FIG. 6 embodiment that the color of light radiated from the top side is yet biased toward visible red. Although in FIG. 6 there are now amber LEDs (28, 48) on the top side, there is the same number of red LEDs (12, 22, 32, and 42) as there were in the device of FIG. 3. Nevertheless, the color mix radiated from the other (bottom) side is comparatively improved over the version of FIG. 3 because there are now three different colors of LEDs disposed along that side.

Figure 7:
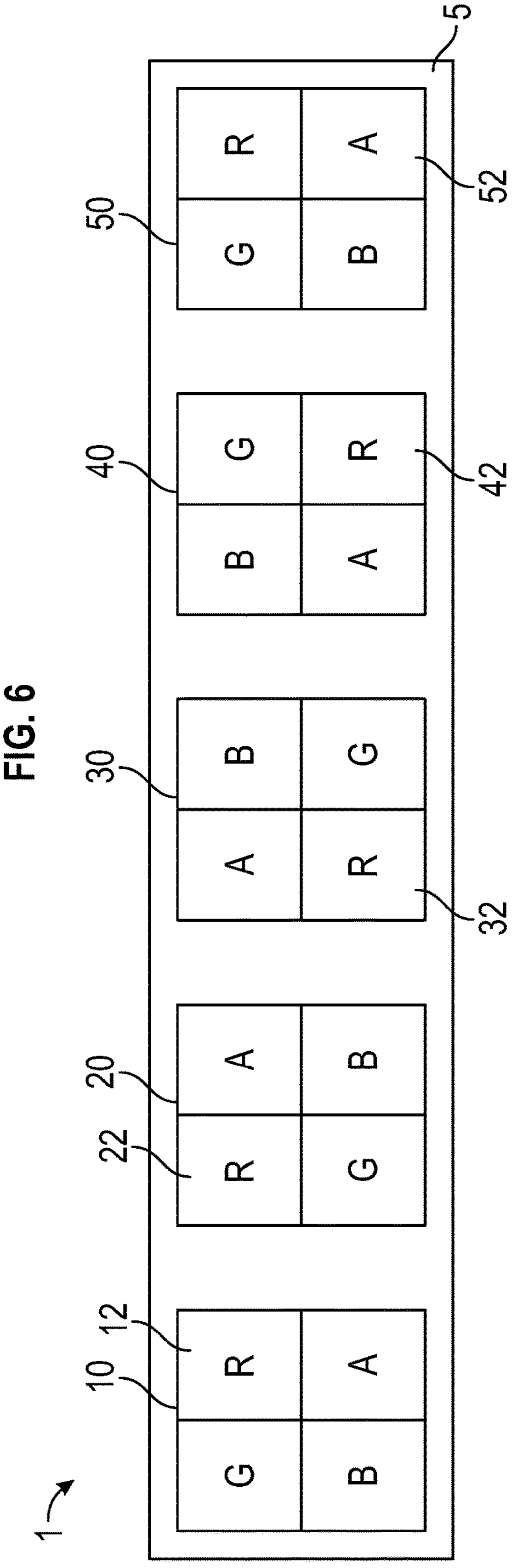
FIG. 7 is a is a view of yet another alternative embodiment of a luminaire according to the present invention, having five clusters of colored LEDs, each cluster having a foursquare array of four LEDs of differing wavelengths, but with the LEDs specially arranged and positioned according to the present invention.

FIG. 7 depicts yet another alternative embodiment of the luminaire apparatus. In this embodiment, as in those previously described, each cluster includes, for example, a red LED (R), a green LED (G), a blue LED (B), and an amber LED (A). In FIG. 7, however, the positional configuration of each cluster is shifted by 90° in relation to both clusters adjacent thereto. There are in the luminaire 1 five clusters 10, 20, 30, 40 and 50. The LEDs of the first cluster 10 are arranged as seen in the first clusters 10 in FIGS. 5 and 6. The LEDs of the second cluster 20 are arranged as seen in the second and fourth clusters 20, 40 of FIGS. 6, i.e., rotated counterclockwise by ninety degrees to place the red LED 22 in the second quadrant. In the embodiment of FIG. 7, however, the third cluster 30 is rotated counterclockwise an additional ninety degrees relative to the second cluster 20—i.e., 180° degrees relative to the first cluster 10—so that the red LED 32 is, in the embodiment of FIG. 7, disposed in the third quadrant. It is seen also that the fourth cluster 40 is rotated counterclockwise an additional ninety degrees relative to the third cluster 30 (that is, 270° degrees relative to the first cluster 10) so to locate the red LED 42 in the fourth quadrant of the cluster. The fifth cluster 50 is disposed in a positional configuration that is rotated yet another ninety degrees relative to the fourth cluster 40 such that its rotation in relation to the first cluster 10 is a full 360°; accordingly, the fifth cluster 50 has its LEDs (include the red LED 52) arrayed in the same configuration as in the first cluster 10. It is readily understood, therefore, that as a red LED changes position from quadrant-to-quadrant, within each respective cluster 20, 30, 40 or 50 as one advances attention from left to right along the luminaire 1, a green (G), blue (B), or amber (A) LED likewise appears in correspondingly different quadrants. In FIG. 7, therefore, as one advances from left to right in the figure, each respective cluster is rotated 90° counterclockwise in relation to the cluster immediately adjacent to its left. The foursquare array of colored LEDs in any given cluster 10, 20, 30, 40 and 50 is different from the array of any adjacent cluster. The arranged pattern of colored LEDs (R), (G), (B) and (A) does not repeat until the fifth counted cluster along the axis of the luminaire 1.

The embodiment of FIG. 7, while more complex than the previously disclosed embodiments, offers a through mixing of wavelengths of light emitted from the full luminaire 1. Along the "top" of this embodiment, there are three green LEDs (G), two blue LEDs (B), two amber LEDs (A), and three red LEDs (R). As there are only two amber LEDs, the color more akin to red, there is not a dominant red-amber mix of wavelengths from the top side of the luminaire 1. (The total of red and amber LEDs along the top side of the luminaire 1 is five.) Similarly, blue and green are similar wavelengths, and as there are two blue LEDS (B) and three green LEDs on the top side of the luminaire 1, the total of blue and green LEDs is five, thus balancing with the red-amber wavelengths and offering a well-mixed emission of colored light.

It is emphasized that the LED colors disclosed hereinabove, and the positional relationships of different colors within any single cluster, are examples only. The invention may be practiced using LEDs of any number of different colors, and with LED colors (including white) arranged other than as specified hereinabove, may be used.

Although the invention has been described in detail with particular reference to these preferred embodiments, other embodiments can achieve the same results. In this description, specific details are set forth, such as specific materials, structures, processes, etc., in order to provide a thorough understanding of the present invention. However, as one having ordinary skill in the art of LED lighting fixtures would recognize, the present invention can be practiced without resorting strictly only to the details specifically set forth. In other instances, well-known concepts and compositions have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover by the appended claims all such modifications and equivalents.

What is claimed is:

1. A lighting apparatus comprising at least four separate clusters of light emitting diodes (LEDs) fixedly positioned in a series along one single line upon a substrate which substrate defines a plane, each of the clusters having one or two, but less than three, other clusters adjacent thereto, wherein:

each cluster comprises a foursquare array having four interior quadrants, each quadrant of the cluster mounting an LED of a different color than any other quadrant in the cluster; and each cluster having a position upon the substrate wherein the position of a second cluster is rotated by ninety degrees, on the plane of the substrate, in relation to an adjacent first cluster.

2. The lighting apparatus according to claim 1 wherein the cluster positions alternate along the substrate whereby every other cluster has the same arrangement of colored LEDs.

3. A luminaire fixture comprising at least four separate clusters of light emitting diodes (LEDs) positioned linearly along one single line upon a substrate which substrate defines a plane, each and every of the clusters having one or two, but less than three, other clusters adjacent thereto, wherein:

each cluster comprises a foursquare array having four interior quadrants, each quadrant of the cluster mounting an LED of a different color than any other quadrant in the cluster; and each cluster having a position upon the substrate wherein the position of a first cluster is rotated by one hundred and eighty degrees, on the plane of the substrate, in relation to an adjacent second cluster.

4. The luminaire fixture according to claim 3 The lighting wherein the cluster positions alternate along the substrate whereby every other cluster has the same arrangement of colored LEDs.

5. A luminaire fixture comprising at least five clusters of light-emitting diodes (LEDs) fixedly positioned in a series along only one line upon a substrate which substrate defines a plane, each of the clusters having one or two, but less than three, other clusters adjacent thereto, wherein:

each cluster comprises a foursquare array having four interior quadrants, each quadrant of the cluster mounting an LED of a different color than any other quadrant in the cluster; and the position of a second cluster is rotated by ninety degrees, on the plane of the substrate, in relation to an adjacent first cluster;

the position of a third cluster adjacent to the second cluster is rotated one hundred and eighty degrees, on the plane of the substrate, relative to the first cluster;

the position of a fourth cluster adjacent to the third cluster is rotated two hundred and seventy degrees, on the plane of the substrate, relative to the first cluster; and the position of a fifth cluster adjacent to the fourth cluster is rotated ninety degrees, on the plane of the substrate, relative to the fourth cluster, whereby a configuration of the LEDs of the fifth cluster is the same as a configuration of the LEDs of the first cluster.

* * * * *